(12) United States Patent
Jeong et al.

(10) Patent No.: US 7,835,909 B2
(45) Date of Patent: Nov. 16, 2010

(54) METHOD AND APPARATUS FOR NORMALIZING VOICE FEATURE VECTOR BY BACKWARD CUMULATIVE HISTOGRAM

(75) Inventors: So-Young Jeong, Seoul (KR); Gil Jin Jang, Suwon-si (KR); Kwang Cheol Oh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1008 days.

(21) Appl. No.: 11/637,132

(22) Filed: Dec. 12, 2006

(65) Prior Publication Data

US 2007/0208562 A1 Sep. 6, 2007

(30) Foreign Application Priority Data

Mar. 2, 2006 (KR) ...................... 10-2006-0019885

(51) Int. Cl.
*G10L 19/14* (2006.01)
*G10L 13/02* (2006.01)
*G10L 15/00* (2006.01)
*G10L 15/02* (2006.01)
*G10L 13/00* (2006.01)
*G10L 13/06* (2006.01)

(52) U.S. Cl. ................. 704/234; 704/240; 704/263; 704/269

(58) Field of Classification Search ........ 704/200, 704/203–206, 211–218, 224–231, 234–240, 704/246–250, 263–269, E19.001–E19.049, 704/E21.001–E21.02, E11.001–E11.007
See application file for complete search history.

(56) References Cited

U.S. PATENT DOCUMENTS

| | | | | |
|---|---|---|---|---|
| 4,817,156 | A * | 3/1989 | Bahl et al. | 704/256.2 |
| 5,577,135 | A * | 11/1996 | Grajski et al. | 382/253 |
| 5,872,867 | A * | 2/1999 | Bergen | 382/254 |
| 6,182,037 | B1 * | 1/2001 | Maes | 704/247 |
| 6,253,165 | B1 * | 6/2001 | Malvar | 703/2 |
| 6,470,314 | B1 * | 10/2002 | Dharanipragada et al. | 704/231 |
| 6,873,953 | B1 * | 3/2005 | Lennig | 704/253 |
| 7,031,980 | B2 * | 4/2006 | Logan et al. | 1/1 |
| 7,684,988 | B2 * | 3/2010 | Barquilla | 704/256.1 |
| 2002/0026309 | A1 * | 2/2002 | Rajan | 704/200.1 |
| 2002/0181711 | A1 * | 12/2002 | Logan et al. | 381/1 |

(Continued)

OTHER PUBLICATIONS

Suh, Youngjoo et al. "Class-Based Histogram Equalization for Robust Speech Recognition." ETRI Joural, vol. 28, No. 4. Aug. 2006. pp. 502-503.*

(Continued)

*Primary Examiner*—Talivaldis Ivars Smits
*Assistant Examiner*—David Kovacek
(74) *Attorney, Agent, or Firm*—Staas & Halsey LLP (57) ABSTRACT

A method and apparatus for normalizing a histogram utilizing a backward cumulative histogram which can cumulate a probability distribution function in an order from a greatest to smallest value so as to estimate a noise robust histogram. A method of normalizing a speech feature vector includes: extracting the speech feature vector from a speech signal; calculating a probability distribution function using the extracted speech feature vector; calculating a backward cumulative distribution function by cumulating the probability distribution function in an order from a largest to smallest value; and normalizing a histogram using the backward cumulative distribution function.

12 Claims, 9 Drawing Sheets

U.S. PATENT DOCUMENTS

| | | | |
|---|---|---|---|
| 2003/0009333 A1* | 1/2003 | Sharma et al. | 704/246 |
| 2003/0086341 A1* | 5/2003 | Wells et al. | 369/13.56 |
| 2003/0101181 A1* | 5/2003 | Al-Kofahi et al. | 707/7 |
| 2003/0103647 A1* | 6/2003 | Rui et al. | 382/103 |
| 2003/0204398 A1* | 10/2003 | Haverinen et al. | 704/233 |
| 2004/0131273 A1* | 7/2004 | Johnson et al. | 382/254 |
| 2005/0131680 A1* | 6/2005 | Chazan et al. | 704/205 |
| 2005/0261897 A1* | 11/2005 | Jelinek | 704/219 |
| 2006/0010145 A1* | 1/2006 | Al-Kofahi et al. | 707/100 |
| 2006/0085187 A1* | 4/2006 | Barquilla | 704/243 |
| 2007/0208562 A1* | 9/2007 | Jeong et al. | 704/234 |

OTHER PUBLICATIONS

Suh, Youngjoo, et al. "Histogram Equalization Utilizing Window-Based Smoothed CDF Estimation for Feature Compensation." The Instutitue of Electronics, Information and Communication Engineers. vol. E91-D, No. 8. Aug. 2008. pp. 2198-2202.*

Suh, Youngjoo, et al. "Probabilistic Class Histogram Equalization for Robust Speech Recognition." IEEE Signal Processing Letters, vol. 14, No. 4. Apr. 2007. pp. 287-290.*

* cited by examiner

| TEST CONDITION<br>(% RECOGNITION ACCURACY) | | | MFCC<br>BASELINE | MFCC+<br>CMS | MFCC<br>+MVN | MFCC<br>+MVN<br>+FHEQ | MFCC<br>+MVN<br>+BHEQ |
|---|---|---|---|---|---|---|---|
| TIMIT 8KHZ CLEAN | | | 62.71 | 62.50 | 62.21 | 62.85 | 62.90 |
| ADDITIVE<br>NOISE-<br>CORRUPTED<br>TIMIT8K | WHITE<br>GAUSSIAN | 0dB | 16.73 | 17.15 | 26.17 | 26.66 | 28.80 |
| | | 10dB | 26.30 | 27.68 | 32.16 | 34.04 | 39.17 |
| | | 20dB | 39.69 | 39.67 | 45.17 | 46.16 | 50.12 |
| CHANNEL<br>-CORRUPTED<br>TIMIT8K | NTIMIT | | 33.20 | 36.02 | 39.41 | 40.27 | 43.34 |
| | CTIMIT | | 25.65 | 30.28 | 35.57 | 36.17 | 37.03 |

METHOD AND APPARATUS FOR NORMALIZING VOICE FEATURE VECTOR BY BACKWARD CUMULATIVE HISTOGRAM

CROSS-REFERENCE TO RELATED APPLICATION

This application claims the benefit of Korean Patent Application No. 10-2006-0019885, filed on Mar. 2, 2006, in the Korean Intellectual Property Office, the disclosure of which is incorporated herein by reference.

BACKGROUND OF THE INVENTION

1. Field of the Invention

The present invention relates to a method and apparatus for normalizing a speech feature vector utilizing a backward cumulative histogram, and more particularly, to a method and apparatus for normalizing a histogram utilizing a backward cumulative histogram which can cumulate a probability distribution function in an order from a greatest to a smallest value so as to estimate a noise robust histogram.

2. Description of Related Art

Generally, a speech recognition system utilized in various environments must extract a speech feature vector, which is robust against noise, as an essential element for stable speech recognition.

A histogram normalization based nonlinear conversion algorithm is currently being developed so as to conform to a statistical feature of speech data in which a speech feature vector is clean in a noisy environment.

An example of a conventional histogram normalization method is described in an article entitled "Evaluation of quantile-based histogram normalization with filter combination on the Aurora3 and Aurora4 database" (Hilger et al., RWTH Achen-University of Technology, Eurospeech, 2005). This method does not take a cumulative distribution function (hereinafter, CDF) modeling using the entire histogram, but divides the CDF modeling into four quantiles so as to solve a lack of data. However, this example of the conventional histogram normalization method utilizes a forward histogram estimation method which cumulates a probability distribution function (PDF) in an order from a smallest to a greatest value.

Figure 1:
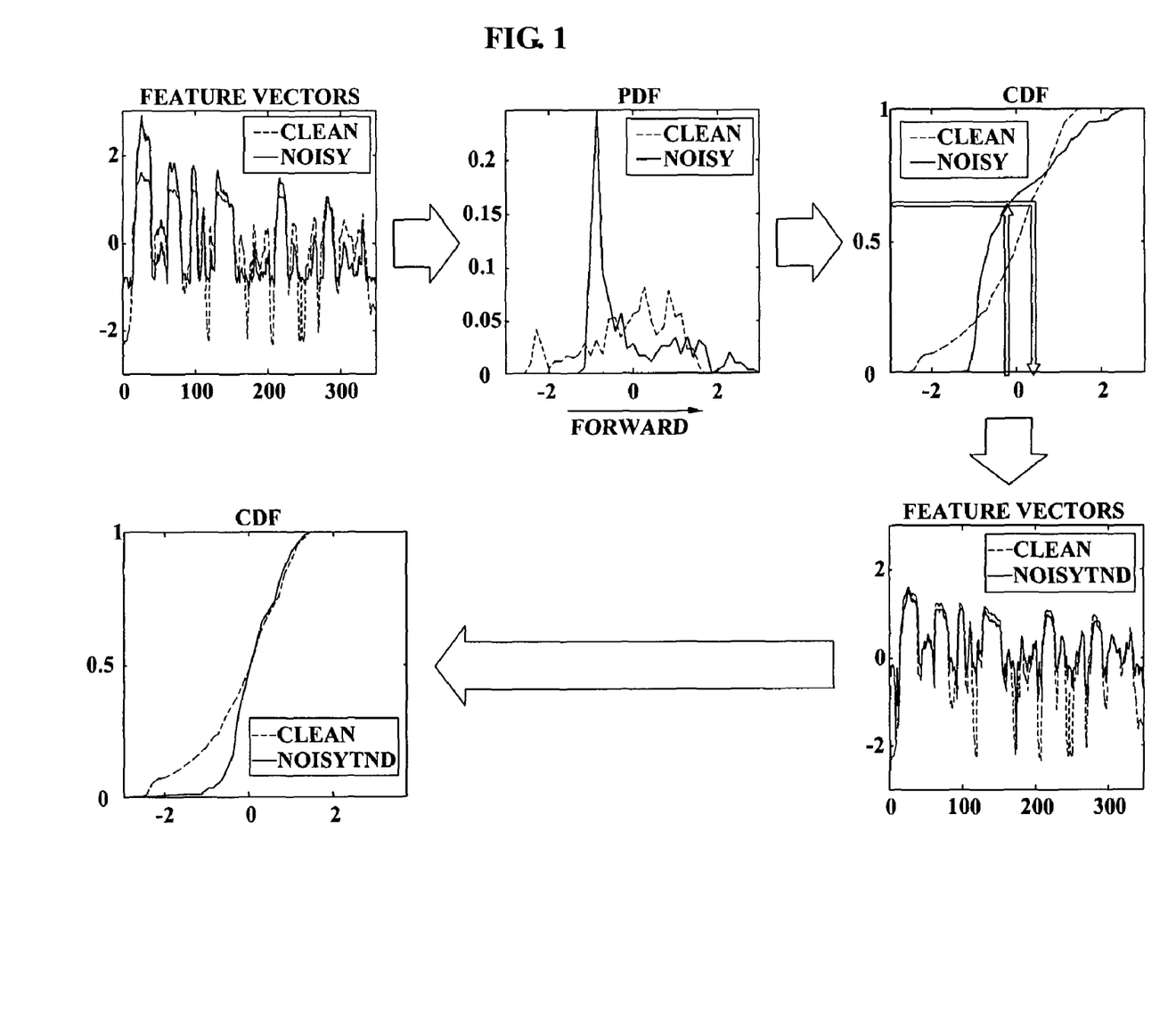
FIG. 1 is a diagram illustrating a normalization of a speech feature vector by a forward histogram normalization method according to a conventional art.

Specifically, as shown in FIG. 1, this conventional forward histogram estimation method divides a variable section of a speech vector into a predetermined number of bins, constitutes a PDF corresponding to each of the divided bins, cumulates the PDF in an order from a smallest to largest value, and thereby generates a CDF, and utilizes the generated CDF as a histogram.

Another example of a conventional histogram normalization method is described in an article entitled "Enhanced histogram normalization in the acoustic feature space" (Molau, et al., RWTH Achen-University of Technology, ICSLP, 2002). This method divides learning data into a speech section and a silent section and thus, obtains each histogram CDF, and also calculates the entire CDF by considering a ratio of the silent section. However, this example of the conventional histogram normalization method also proposes only the forward histogram estimation method which cumulates a PDF in an order from a smallest to largest value.

Yet another example of a conventional histogram normalization method is disclosed in U.S. Patent Publication No. 2003/0204398 entitled "Online parametric histogram normalization for noise robust speech recognition (assigned to the Nokia Corporation). This method obtains the mean and distribution of learning data utilizing 38 frame buffers from a test speech vector, and improves a histogram utilizing the mean and dispersion that is obtained from the learning data. However, the example of the conventional histogram normalization method also discusses only the forward histogram estimation method which cumulates a PDF from a smallest to largest value.

A histogram estimation must be robust against noise so that the conventional histogram normalization method may effectively work.

Figure 2:
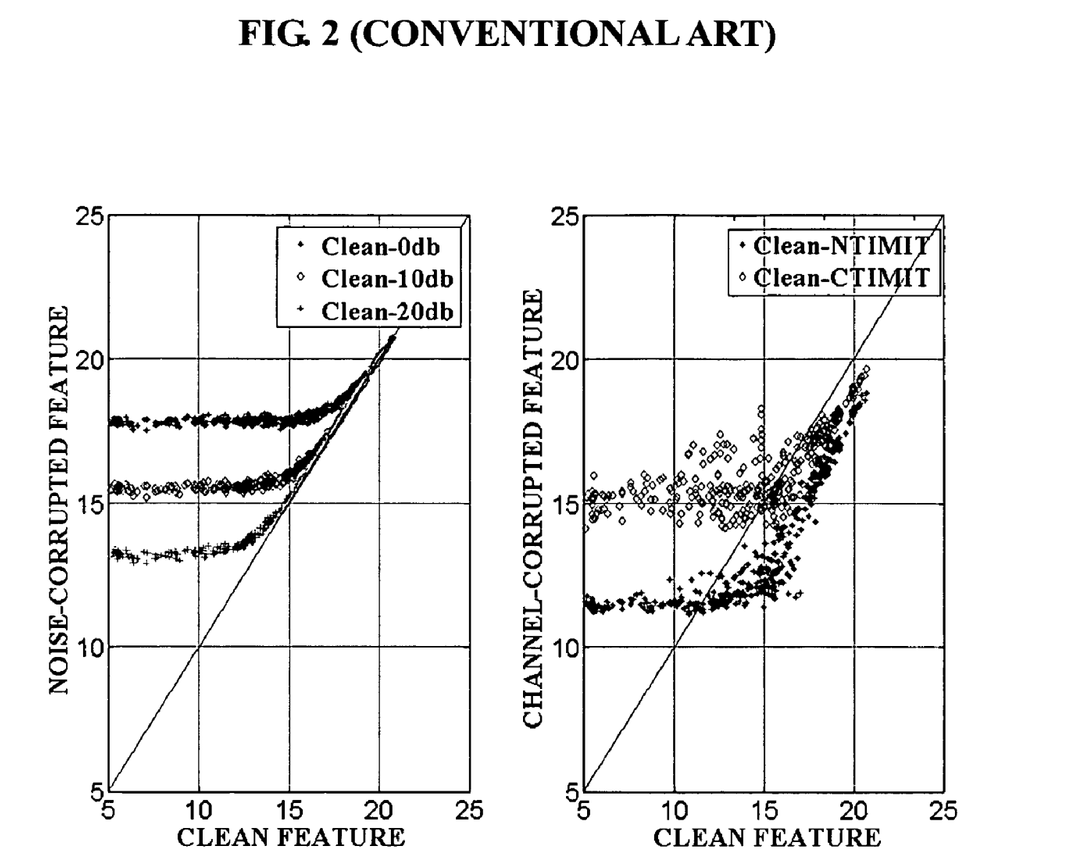
FIG. 2, parts (a) and (b), are diagrams illustrating a distortion of a speech feature vector by additive noise and channel according to the conventional art.

FIG. 2, parts (a) and (b), are diagrams illustrating a distortion of a speech feature vector by additive noise and a channel.

Referring to FIG. 2, parts (a) and (b), a distortion of a signal section where the size of a speech signal is comparatively large, i.e. a peak, is not so severe in comparison to the distortion of the signal section where the size of the speech signal is comparatively small.

However, in the conventional forward histogram estimation method, when a speech signal is corrupted by noise, the size of a signal section with a comparatively small value, i.e. a valley section, is severely distorted in comparison to the distortion of the signal section with a comparatively great value, i.e. a peak section.

As described above, when cumulating a PDF to obtain a CDF, the conventional forward histogram normalization method cumulates the PDF in an order from a smallest to largest value. Accordingly, an error is also cumulated and thus, the shape of the CDF may be extremely distorted which may cause a histogram matching error. Specifically, since the conventional forward histogram normalization method is significantly affected by noise, the reliability of the histogram estimation may be decreased.

Accordingly, a method of estimating a noise robust histogram in a speech recognition system is required.

BRIEF SUMMARY

An aspect of the present invention provides a method and apparatus for normalizing a speech feature vector which can utilize a backward histogram so that histogram statistics of a noise speech may be converted to be similar to histogram statistics of a clean speech in a speech recognition system.

An aspect of the present invention also provides a method and apparatus for normalizing a speech feature vector which enables a backward histogram normalized speech feature vector in a cepstrum rather than a conventional forward histogram normalized speech feature vector to be similar to a clean speech feature vector in a speech recognition system.

An aspect of the present invention also provides a method and apparatus for normalizing a speech feature vector in which a speech recognition rate with respect to a speech database distorted by a channel and noise is improved in a speech recognition system.

According to an aspect of the present invention, there is provided a method of normalizing a speech feature vector, the method including: extracting the speech feature vector from a speech signal; calculating a probability distribution function using the extracted speech feature vector; calculating a backward cumulative distribution function by cumulating the probability distribution function in an order from a greatest to a smallest value; and normalizing a histogram using the backward cumulative distribution function.

According to another aspect of the present invention, there is provided an apparatus of normalizing a speech feature vector, the apparatus including: a feature extraction unit extracting the speech feature vector from a speech signal; a probability distribution function calculation unit calculating a probability distribution function using the extracted speech feature vector; a backward cumulative distribution function calculation unit calculating a backward cumulative distribution function by cumulating the probability distribution function in an order from a greatest to a smallest value; and a histogram normalization unit normalizing a histogram using the backward cumulative distribution function.

According to another aspect of the present invention, there is provided an apparatus for normalizing a speech vector, the apparatus including: a feature extraction unit dividing a variable section of the speech feature vector into a predetermined number of sections; a probability distribution function calculation unit calculating a probability distribution function corresponding to each of the divided sections; and a histogram normalization unit normalizing a histogram using a backward cumulative distribution function which cumulates the probability distribution function in an order from a greatest to a smallest value.

According to another aspect of the present invention, there is provided an histogram normalization method, including: extracting a feature vector from a received speech signal by dividing the received speech signal into frame units; applying a fast Fourier transform (FFT) to the divided speech signal; frequency domain filtering the transformed speech signal; logarithmically compressing the frequency domain filtered speech signal so as to reduce a dynamic range thereof; performing a discrete cosine transform (DCT) to eliminate a correlation between signals in each band of the speech signal; performing a mean variance normalization (MVN) so that the signals in each band have a zero mean and a unit variance; and normalizing a histogram using a backward histogram so that a statistical feature of extracted feature vector of the noisy speech signal is be similar to a model learning vector of the clean speech signal.

A learning and testing method utilizing a backward cumulative distribution function (CDF) in a speech recognition system, the method including: extracting a feature vector from a received clean speech signal; post processing the feature vector extracted from the clean speech signal; calculating a backward CDF using the speech vector extracted of the clean speech signal by dividing a variable section of the extracted feature vector of he clean speech signal into a predetermined number of sections, calculating a probability distribution function (PDF) corresponding to each divided bin, cumulating the calculated PDF in an order from a greatest value to a smallest value; extracting a feature vector from a received noisy speech signal; calculating a backward CDF of the noisy speech signal using the feature vector extracted from the noisy speech signal by dividing a variable section of the extracted feature vector into a predetermined number of sections, calculating a probability distribution function (PDF) corresponding to each divided bin, cumulating the calculated PDF in an order from a greatest value to a smallest value; normalizing a feature vector for each band of the noisy speech signal by estimating a value of the backward CDF of the noisy speech signal to be a value of the backward CDF of the clean speech signal; post processing the normalized feature vector for each band of the noisy speech signal; and performing a hidden Markov model (HMM) according to a post processing result of the clean speech signal and a post processing result of the normalized feature vector.

According to yet other aspects of the present invention, there are provided computer-readable record medium storing programs for implementing the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
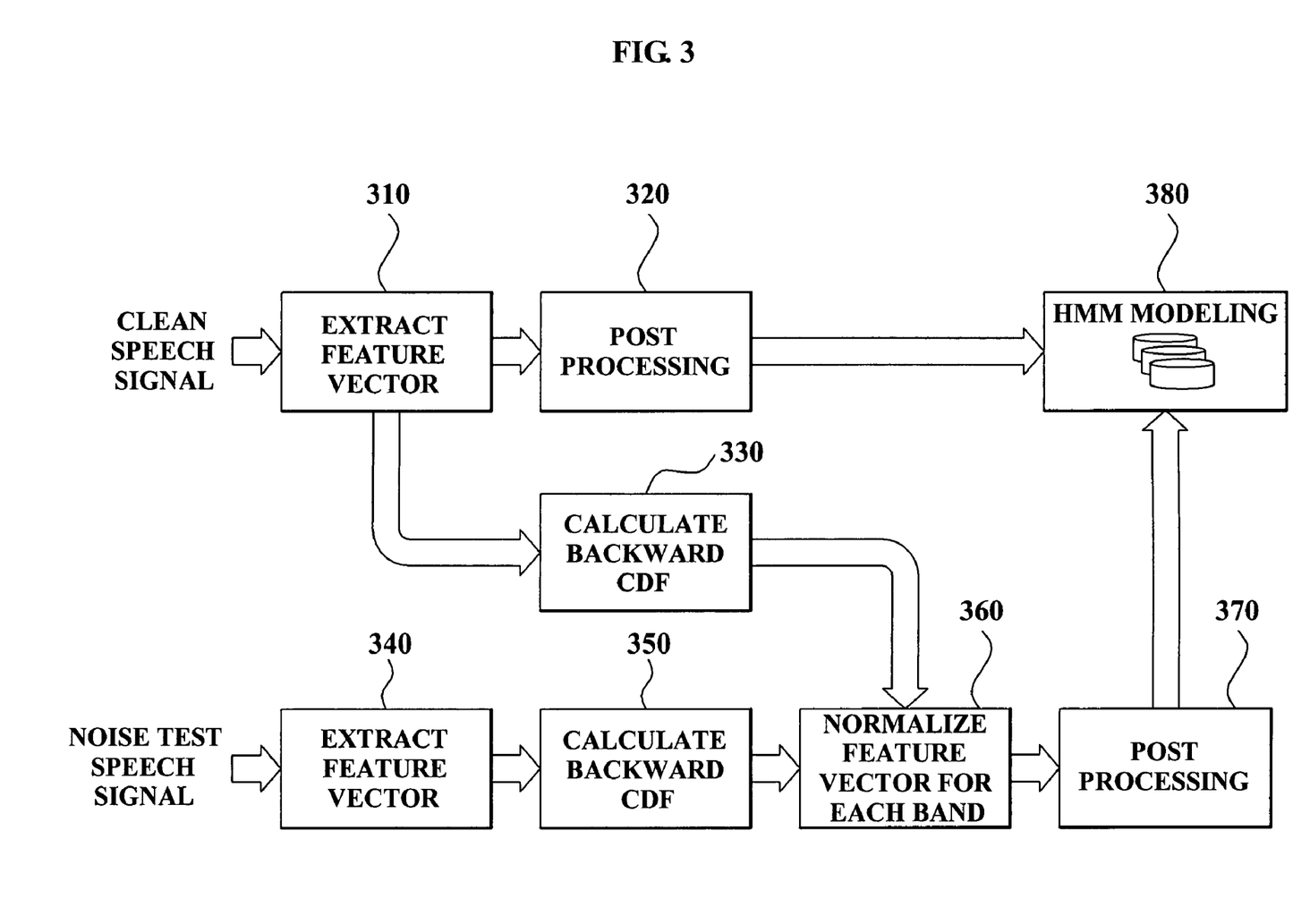
FIG. 3 is a diagram illustrating a learning and testing process utilizing a backward CDF in a speech recognition system according to an embodiment of the present invention.
Figure 4:
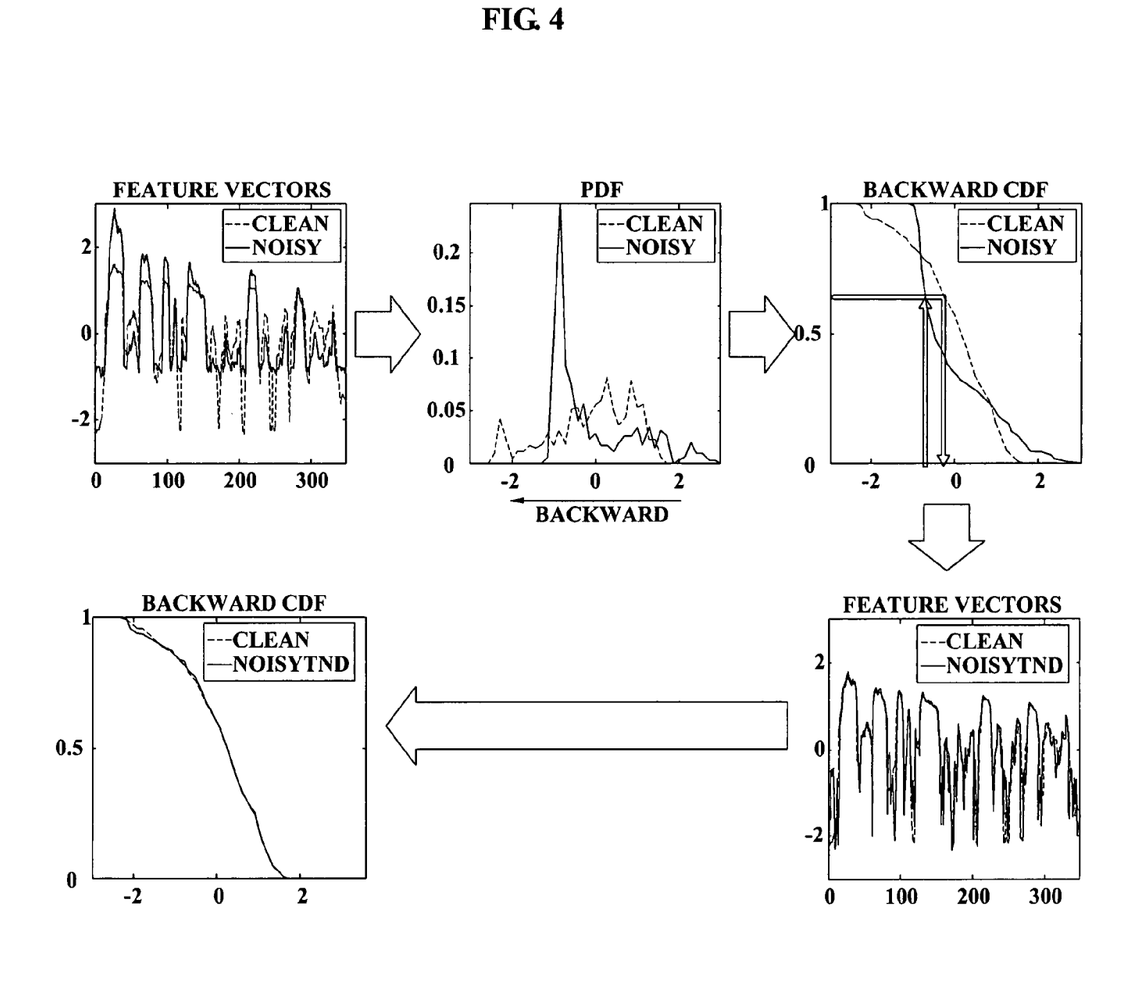
FIG. 4 is a diagram illustrating a normalization of a speech feature vector by a backward histogram normalization method according to an embodiment of the present invention.

FIG. 3 is a diagram illustrating a learning and testing process utilizing a backward cumulative distribution function (CDF) in a speech recognition system according to an embodiment of the present invention, and FIG. 4 is a diagram illustrating a normalization of a speech feature vector by a backward histogram normalization method according to an embodiment of the present invention.

Referring to FIG. 3, in operation 310, a speech recognition system receives a clean speech signal from a learning database (not illustrated) and extracts a feature vector from the clean speech signal.

In operation 320, the speech recognition system performs post processing of the feature vector extracted from the clean speech signal.

In operation 330, the speech recognition system calculates a backward CDF by utilizing the extracted speech vector from the clean speech signal. Specifically, in operation 330, as shown in FIG. 4, the speech recognition system divides a variable section of the extracted feature vector into a predetermined number of bins, calculates a probability distribution function (PDF) corresponding to each of the divided bins, cumulates the calculated PDF in an order from a greatest to a smallest value, and thus, calculates the backward CDF with respect to the clean speech signal.

In operation 340, the speech recognition system receives a noise test speech signal and extracts a feature vector from the received noise test speech signal.

In operation 350, the speech recognition system calculates a backward CDF of the noise test speech signal by utilizing the extracted feature vector from the noise test speech signal. Specifically, in operation 350, as shown in FIG. 4, the speech recognition system divides a variable section of the extracted feature vector from the noise test speech signal, into a predetermined number of bins, calculates a PDF corresponding to each of the divided bins, cumulates the calculated PDF in an order from a greatest to a smallest value, and thus, calculates the backward CDF with respect to the noise test speech signal.

In operation 360, the speech recognition system normalizes a feature vector for each band of the noise test speech signal by referring to a value of the backward CDF of the clean speech signal and a value of the backward CDF of the noise test speech signal. Specifically, in operation 360, the speech recognition system estimates the value of the backward CDF of the noise test speech signal to be the value of the backward CDF of the clean speech signal, and normalizes the feature vector for each band.

In operation 370, the speech recognition system performs post processing according to the normalized feature vector for each band.

In operation 380, the speech recognition system performs a hidden Markov model (HMM) according to the result of post processing of the clean speech signal and the result of post processing of the normalized feature vector for each band.

Figure 5:
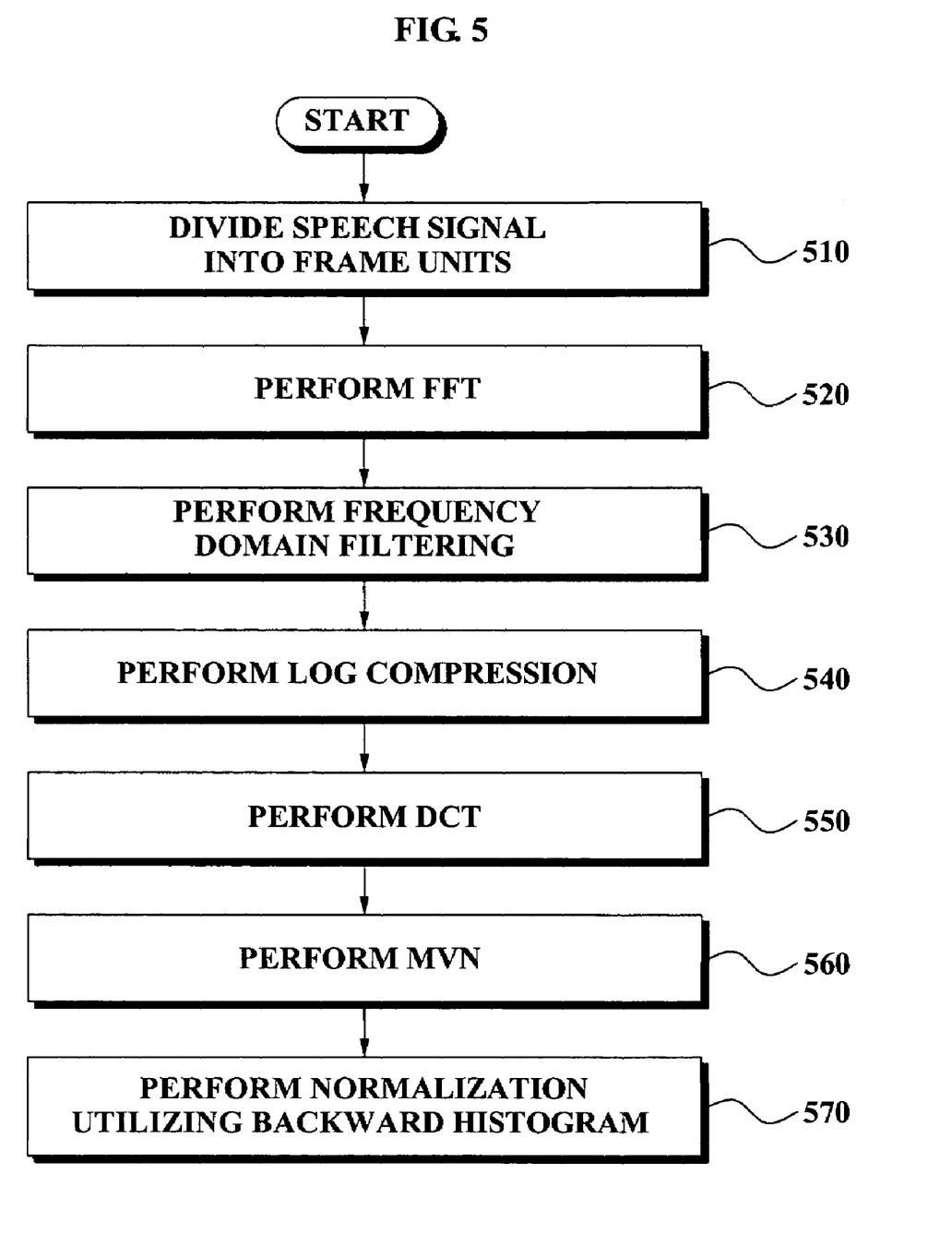
FIG. 5 is a flowchart illustrating a histogram normalization method according to an embodiment of the present invention.

FIG. 5 is a flowchart illustrating a histogram normalization method according to an embodiment of the present invention.

Referring to FIG. 5, in operation 510, a speech recognition system divides a received speech signal into predetermined frame units, so as to extract a feature vector from the speech signal.

In operation 520, the speech recognition system applies a fast Fourier transform (FFT) to the speech signal divided into the frame units, so as to analyze the speech signal in a frequency domain.

In operation 530, the speech recognition system imitates a ciliated cell auditory signal process with respect to the FFT applied speech signal and performs frequency domain filtering, (i.e. a mel Filter Bank).

In operation 540, the speech recognition system performs a logarithm compression to reduce a dynamic range with respect to the filtered speech signal.

In operation 550, the speech recognition system performs a discrete cosine transform (DCT) to eliminate a correlation between signals in each band.

In operation 560, the speech recognition system performs a mean variance normalization (MVN) so that the signals in each band may have a zero mean and a unit variance.

In operation 570, the speech recognition system performs normalization utilizing a backward histogram, so that a statistical feature of a test speech vector of a noisy speech signal may be similar to a model learning vector of a clean speech signal.

Figure 6:
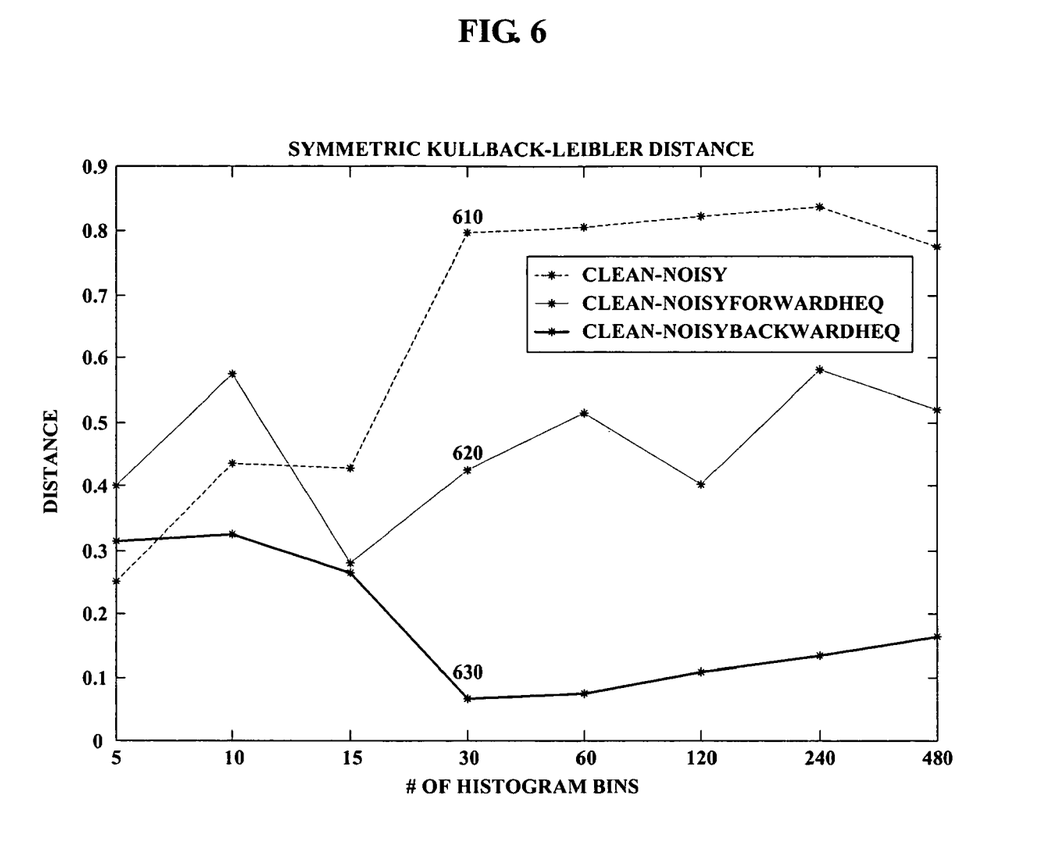
FIG. 6 is a graph illustrating a distance between PDFs around a histogram conversion.

FIG. 6 is a graph illustrating a distance between PDFs around a histogram conversion.

Referring to FIG. 6, in the graph, the distance between PDFs around the histogram conversion is measured utilizing a symmetric Kullback-Leibler (sKL) metric, i.e. Equation 1 below $$sKL(p, q) = \sum_{x}\left(p(x)\log\frac{p(x)}{q(x)} + q(x)\log\frac{q(x)}{p(x)}\right). \quad \text{[Equation 1]}$$

A point 610 indicates a measured distance between PDFs of a clean signal and a noise signal before a histogram conversion. Point 620 indicates the measured distance between PDFs of the clean signal and the noise signal after applying a forward histogram to the noise signal. Point 630 indicates the measured distance between PDFs of the clean signal and the noise signal after applying a backward histogram to the noise signal.

When a number of bins of the histogram is 10 and the forward histogram is applied, an sKL distance is increased due to a quantization error which occurs when estimating a CDF. Accordingly, a performance of the speech recognition system utilizing the forward histogram is deteriorated. However, in the case of the backward histogram according to the present embodiment, the sKL distance is decreased. Accordingly, the performance of the speech recognition system utilizing the backward histogram according to the present embodiment is improved. Also, when a number of bins of the histogram is 30, the sKL distance is significantly decreased in the backward histogram. Accordingly, the performance of the speech recognition system utilizing the backward histogram according to the present embodiment is improved.

As described above, in comparison to the method of utilizing the conventional forward histogram, the method of utilizing the backward histogram according to the present embodiment may accomplish a desired performance with a smaller required number of bins of the histogram.

Figure 7:
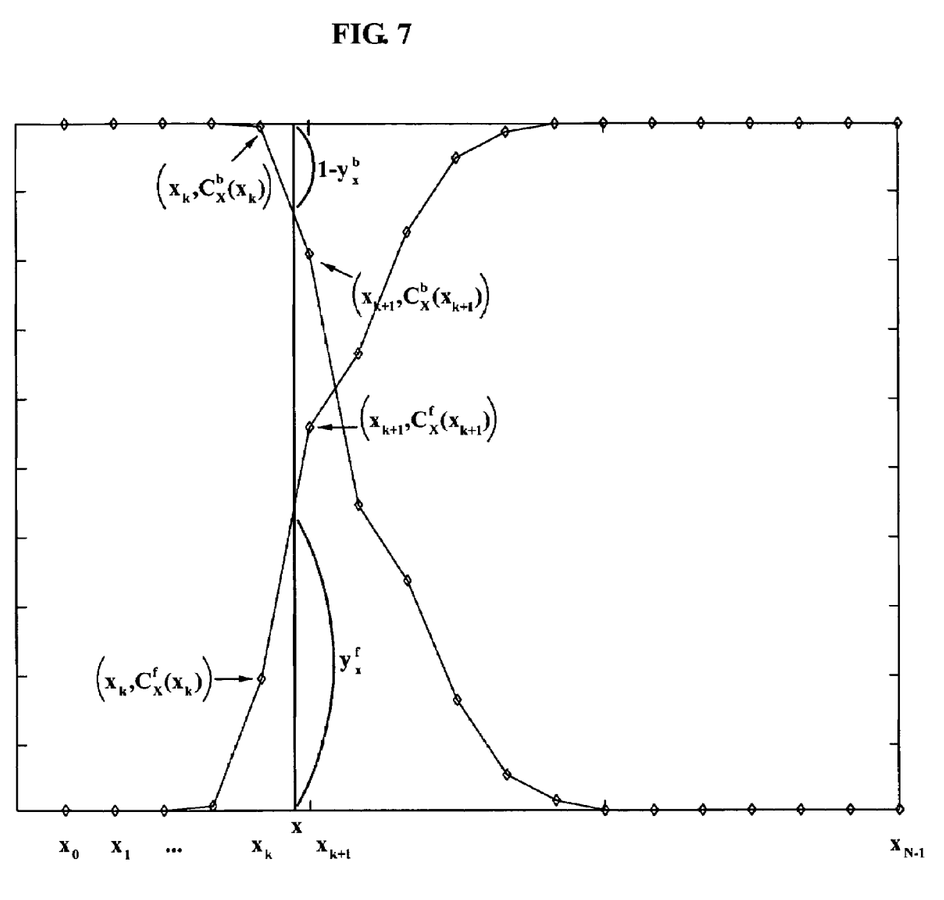
FIG. 7 is a graph illustrating a relation between a matching error of a histogram of a clean speech feature vector and a bin width in a forward cumulative histogram, and a backward cumulative histogram.

FIG. 7 is a graph illustrating a relation between a matching error of a histogram of a clean speech feature vector and a bin width in a forward cumulative histogram, and a backward cumulative histogram.

Referring to FIG. 7, to find the relation between the matching error of the histogram of the clean speech feature vector and the bin width in the backward cumulative histogram and the forward cumulative histogram of the speech feature vector containing noise, $x_0 < x_1 < \ldots < x_{N-1}$ in $[x_0, x_{N-1}]$, i.e. an N number of bin sections with an identical size.

When a value of a forward histogram is $C_X^f(x_k)$ and a value of a backward histogram is $C_X^b(x_k)$ in $x_k$, and a point of $x_k \leq x \leq x_{k+1}$ is converted for a histogram of a clean speech feature vector, $y_x^b$ and $y_x^f$ must be obtained by an interpolation. Information on a matching error which occurs when applying the forward histogram and the backward histogram may be understood by comparing the obtained $y_x^b$ and $y_x^f$.

Specifically, since the cumulative histogram with respect to a clean speech shows a dynamic range and a smooth change in comparison to a noise speech, the matching error may be decreased the smaller a y value becomes with respect to an identical x.

$y_x^b$ and $y_x^f$ are obtained by utilizing a linear interpolation as given by $$y_x^f = \frac{(x - x_k)C_X^f(x_{k+1}) + (x_{k+1} - x)C_X^f(x_k)}{x_{k+1} - x_k} \quad \text{[Equation 2]}$$

$$1 - y_x^b = 1 - \frac{(x - x_k)C_X^b(x_{k+1}) + (x_{k+1} - x)C_X^b(x_k)}{x_{k+1} - x_k}.$$

In this instance, the forward histogram and the backward histogram are defined as $$C_X^f(x_{k+1}) = C_X^f(x_k) + P_X(x_{k+1})$$

$$C_X^b(x_k) = C_X^b(x_{k+1}) + P_X(x_k). \quad \text{[Equation 3]}$$

When substituting Equation 3 for Equation 2, Equation 2 is arranged as $$y_x^f = C_X^f(x_k) + P(x_{k+1}) \frac{x - x_k}{x_{k+1} - x_k} \quad \text{[Equation 4]}$$

$$1 - y_x^b = 1 - \left[ C_X^b(x_{k+1}) + P(x_k) \frac{x_{k+1} - x}{x_{k+1} - x_k} \right].$$

To find a change in a function value according to a change in a bin width by introducing $\epsilon = y_x^f - (1 - y_x^b)$, a function indicating a difference in y values with respect to the forward histogram and the backward histogram, Equation 4 is arranged as $$\begin{aligned}
\varepsilon &= y_x^f - (1 - y_x^b) \quad \text{[Equation 5]} \\
&= C_X^f(x_k) + C_X^b(x_{k+1}) + \\
&\quad \frac{(x - x_k)P(x_{k+1}) + (x_{k+1} - x)P(x_k)}{x_{k+1} - x_k} - 1 \\
&= C_X^f(x_k) + C_X^b(x_{k+1}) + \frac{\Delta x_k P(x_k) + \Delta P_{x_k}(x - x_k)}{\Delta x_k} - 1 \\
&= C_X^f(x_k) + C_X^b(x_{k+1}) + P(x_k) + \frac{\Delta P_{x_k}}{\Delta x_k}(x - x_k) - 1 \\
&= \frac{\Delta P_{x_k}}{\Delta x_k}(x - x_k)
\end{aligned}$$

In this instance, $$\Delta x_k = x_{k+1} - x_k,$$

$$\Delta P_{x_k} = P(x_{k+1}) - P(x_k), \text{ and}$$

$$C_X^f(x_k) + C_X^b(x_k) = 1.$$

Also, since $x_k \leq x \leq x_{k+1}$, $0 \leq \epsilon \leq \Delta P_{x_k}$.

Also, when the bin width and $\Delta x_k$ of the histogram is smaller, Equation 6 is obtained as below $$0 \leq \lim_{\Delta x_k \to 0} \varepsilon \leq \lim_{\Delta x_k \to 0} \Delta P_{x_k} = 0. \quad \text{[Equation 6]}$$

Specifically, since the difference between PDFs, which are adjacent to each other in the histogram, is converged to '0', $$\lim_{\Delta x_k \to 0} \varepsilon = 0.$$

Accordingly, y values in the forward cumulative histogram and the backward cumulative histogram are identical to each other.

Also, when the bin width and $\Delta x_k$ of the histogram is greater, Equation 7 is obtained as below $$\lim_{\Delta x_k \to \infty} \varepsilon = \lim_{\Delta x_k \to \infty} \frac{\Delta P_{x_k}}{\Delta x_k}(x - x_k) = \lim_{\Delta x_k \to \infty} \Delta P_{x_k}. \quad \text{[Equation 7]}$$

Specifically, since the y value $y_x^f$ of the forward cumulative histogram always has a greater value than the y value $1 - y_x^b$ of the backward cumulative histogram, a greater matching error occurs when the forward cumulative histogram and a cumulative histogram of the clean speech feature vector are matched. Also, when the backward cumulative histogram according to an aspect of the present embodiment and the cumulative histogram of the feature vector with respect to the clean speech signal are matched, a smaller matching error than the conventional cumulative histogram occurs.

Figure 8:
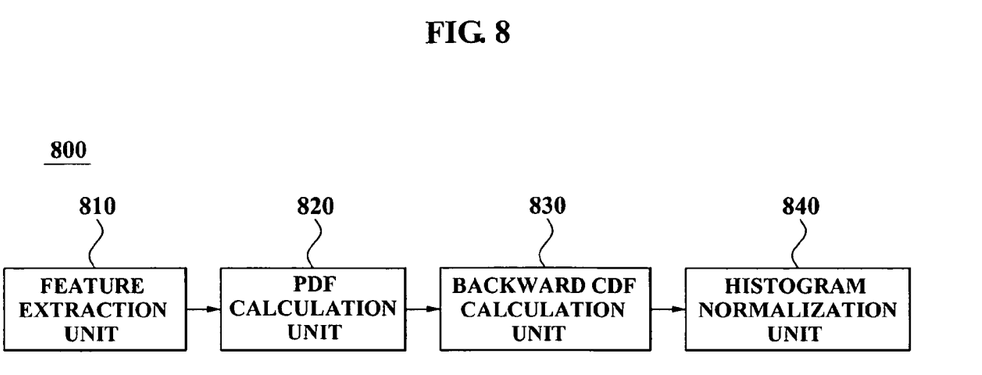
FIG. 8 is a diagram illustrating a configuration of a speech feature vector normalization apparatus utilizing a backward cumulative histogram according to an embodiment of the present invention.

FIG. 8 is a diagram illustrating a configuration of a speech feature vector normalization apparatus 800 utilizing a backward cumulative histogram according to an embodiment of the present invention.

Referring to FIG. 8, the speech feature vector normalization apparatus 800 utilizing the backward cumulative histogram according to the present embodiment includes a feature extraction unit 810, a PDF calculation unit 820, a backward CDF calculation unit 830, and a histogram normalization unit 840.

The feature extraction unit 810 extracts a speech feature vector from a speech signal.

The PDF calculation unit 820 calculates a PDF utilizing the extracted speech feature vector.

The backward CDF calculation unit 830 calculates a backward CDF by cumulating the PDF in an order from a greatest to a smallest value.

The histogram normalization unit 840 normalizes a histogram utilizing the backward CDF.

Figure 9:
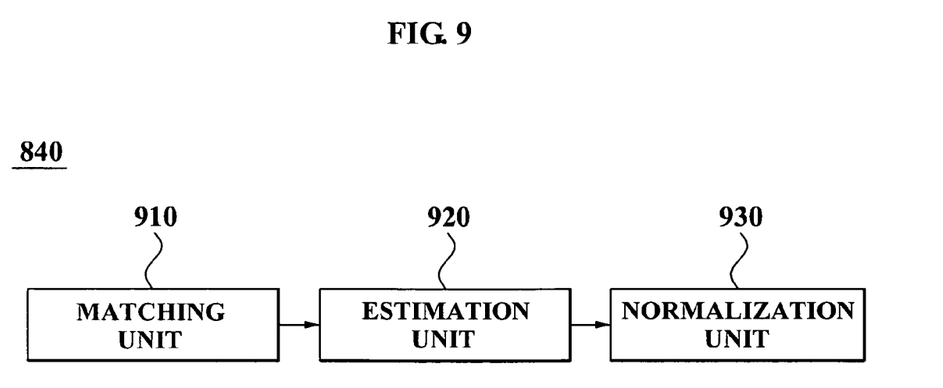
FIG. 9 is a diagram illustrating a configuration of a histogram normalization unit of FIG. 8.

FIG. 9 is a diagram illustrating a configuration of the histogram normalization unit of FIG. 8.

Referring to FIG. 9, the histogram normalization unit 840 includes a matching unit 910, an estimation unit 920, and a normalization unit 930.

The matching unit 910 matches a backward CDF with respect to a speech signal in a noisy environment and the backward CDF with respect to the speech signal in a clean environment.

The estimation unit 920 estimates a value of the backward CDF with respect to the speech signal in the noisy environment as a value of the backward CDF with respect to the speech signal in the clean environment.

The normalization unit 930 normalizes a histogram utilizing the estimate value. Specifically, the normalization unit 930 calculates a PDF from a feature vector of the estimated value, calculates a backward CDF by cumulating the PDF in an order from a greatest to a smallest value, and normalizes the histogram utilizing the backward CDF.

Figure 10:
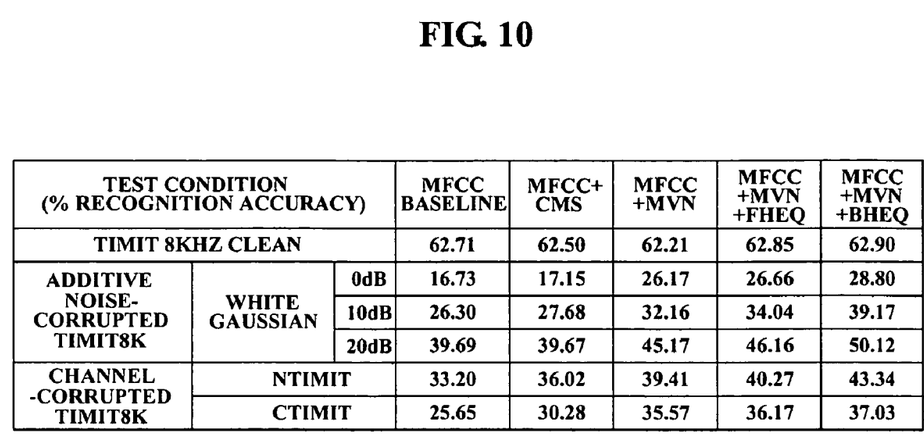
FIG. 10 is a diagram illustrating results of a speech recognition rate test in a speech feature vector normalization apparatus according to an embodiment of the present invention.

FIG. 10 shows results of a speech recognition test with respect to a TIMIT database which is mainly utilized for a benchmarking of the speech recognition test, according to an embodiment of the present invention.

A speech recognition rate is compared by comparing the results of the backward cumulative histogram according to the present embodiment and the conventional speech feature vector normalization method. In this instance, recognition vocabularies with 39 English phonemes, and an HMM having three states for each phoneme was utilized as a recognition model.

Referring to FIG. 10, an MFCC baseline is when utilizing a normalization not applied to a mel frequency cepstral coefficients (MFCC) feature vector, MFCC+CMS is when applying Cepstral Mean Subtraction (CMS) to an MFCC feature vector, MFCC+MVN when applying Mean and Variance Normalization (MVN) to an MFCC feature vector, MFCC+MVN+FHEQ when applying MVN to an MFCC feature vector, and normalizing a histogram utilizing an existing forward cumulative histogram method, and MFCC+MVN+BHEQ when utilizing the backward cumulative histogram method according to an embodiment of the present invention. In this instance, 100 histogram bins were utilized with respect to both the forward and the backward cumulative histogram method.

As shown in FIG. 10, a recognition rate of a speech corrupted by a noise and channel is lower than a clean signal with about 16% through about 39% recognition accuracy, but may be improved to have about 26% through about 46% recognition accuracy. Also, when applying the backward histogram according to an aspect of the present invention, the recognition rate may be improved by about 2 through about 5%, in comparison to the conventional forward histogram.

As described above, in comparison to the conventional forward cumulative histogram, a normalization apparatus utilizing a backward cumulative histogram according to the above-described embodiments of the present invention may convert histogram statistics of a noise speech to be similar to histogram statistics of a clean speech.

Also, the normalization apparatus utilizing the backward cumulative histogram according to the above-described embodiments of present invention may enable a backward histogram normalized speech feature vector in a cepstrum rather than a conventional forward histogram normalized speech feature vector to be similar to a clean speech feature vector in a speech recognition system.

Also, the normalization apparatus utilizing the backward cumulative histogram according to the above-described embodiments of present invention may improve a speech recognition rate in a speech recognition test to be comparable to the conventional forward histogram normalization method, with respect to a speech database distorted by a channel and noise.

The speech feature vector normalization method according to the above-described embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the above-described embodiments of the present invention, a normalization method utilizes a backward histogram in the speech recognition system. Accordingly, in comparison to a normalization method utilizing the conventional forward histogram, histogram statistics of a noise speech may be improved to be similar to histogram statistics of a clean speech.

Also, according to the above-described embodiments of the present invention, a backward histogram normalized speech feature vector in a cepstrum rather than a conventional forward histogram normalized speech feature vector may be similar to a clean speech feature vector in a speech recognition system. Accordingly, a speech recognition rate may be improved.

Also, according to the above-described embodiments of the present invention, a normalization method utilizes a backward histogram in the speech recognition system. Accordingly, a speech recognition rate with respect to a speech database distorted by a channel and noise may be improved to be comparable to the normalization method utilizing the conventional forward histogram.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of normalizing a speech feature vector, the method comprising:
   dividing a variable section of the speech feature vector into a predetermined number of sections;
   calculating a probability distribution function corresponding to each of the divided sections; and
   normalizing a histogram for the speech feature vector, using a backward cumulative distribution function which cumulates the probability distribution function in an order from a greatest to a smallest value, so that a statistical feature of the speech feature vector is similar to a model vector.

2. A method of normalizing a speech feature vector, the method comprising:
   extracting the speech feature vector from a speech signal;
   calculating a probability distribution function using the extracted speech feature vector;
   calculating a backward cumulative distribution function by cumulating the probability distribution function in an order from a greatest to a smallest value; and
   normalizing a histogram for the speech feature vector, using the backward cumulative distribution function, so that a statistical feature of the speech feature vector is similar to a model vector.

3. (The method of claim 2, wherein the normalizing a histogram comprises:
   matching a noisy backward cumulative distribution function of the speech signal in a noisy environment and a clean backward cumulative distribution function of the speech signal in a clean environment;
   estimating a value of the backward cumulative distribution function by estimating a value of the noisy background cumulative distribution function of the speech signal in the noisy environment to be a value of the clean backward cumulative distribution function of the speech signal in the clean environment; and
   normalizing the histogram using the estimated value.

4. The method of claim 3, wherein the normalizing a histogram comprises:
   calculating a probability distribution function from a feature vector of the estimated value; and normalizing the histogram using the backward cumulative distribution function which cumulates the probability distribution function in an order from a greatest to a smallest value.

5. A tangible computer-readable record medium storing a program for implementing a method of normalizing a speech feature vector, the method comprising:
dividing a variable section of the speech feature vector into a predetermined number of sections;
calculating a probability distribution function corresponding to each of the divided sections; and
normalizing a histogram for the speech feature vector, using a backward cumulative distribution function which cumulates the probability distribution function in an order from a greatest to a smallest value, so that a statistical feature of the speech feature vector is similar to a model vector.

6. An apparatus for normalizing a speech feature vector, the apparatus comprising:
a feature extraction unit extracting the speech feature vector from a speech signal;
a probability distribution function calculation unit calculating a probability distribution function using the extracted speech feature vector;
a backward cumulative distribution function calculation unit calculating a backward cumulative distribution function by cumulating the probability distribution function in an order from a greatest to a smallest value; and
a histogram normalization unit normalizing a histogram for the speech feature vector, using the backward cumulative distribution function, so that a statistical feature of the speech feature vector is similar to a model vector.

7. The apparatus of claim 6, wherein the histogram normalization unit comprises:
a matching unit matching a noisy backward cumulative distribution function of the speech signal in a noisy environment and a clean backward cumulative distribution function of the speech signal in a clean environment;
an estimation unit estimating a value of the backward cumulative distribution function by estimating a value of the noisy background cumulative distribution function of the speech signal in the noisy environment to be a value of the clean backward cumulative distribution function of the speech signal in the clean environment; and
a normalization unit normalizing the histogram using the estimated value.

8. The apparatus of claim 7, wherein the normalization unit calculates a probability distribution function from a feature vector of the estimated value, calculates a backward cumulative distribution function by cumulating the probability distribution function in an order from a greatest to a smallest value, and normalizes the histogram utilizing the backward cumulative distribution function.

9. An apparatus for normalizing a speech feature vector, the apparatus comprising:
a feature extraction unit dividing a variable section of the speech feature vector into a predetermined number of sections;
a probability distribution function calculation unit calculating a probability distribution function corresponding to each of the divided sections; and
a histogram normalization unit normalizing a histogram for the speech feature vector, using a backward cumulative distribution function which cumulates the probability distribution function in an order from a greatest to a smallest value, so that a statistical feature of the speech feature vector is similar to a model vector.

10. A histogram normalization method, comprising:
extracting a speech feature vector from a received speech signal by dividing the received speech signal into frame units;
applying a fast Fourier transform (FFT) to the divided speech signal;
frequency domain filtering the transformed speech signal;
logarithmically compressing the frequency domain filtered speech signal so as to reduce a dynamic range thereof;
performing a discrete cosine transform (DCT) to eliminate a correlation between signals in each band of the speech signal;
performing a mean variance normalization (MVN) so that the signals in each band have a zero mean and a unit variance; and
normalizing a histogram for the speech feature vector using a backward histogram so that a statistical feature of a feature vector of a noisy speech signal is similar to a model learning vector of a clean speech signal, based on the mean variance normalization.

11. A learning and testing method utilizing a backward cumulative distribution function (CDF) in a speech recognition system, the method comprising:
extracting a feature vector from a received clean speech signal;
post processing the feature vector extracted from the clean speech signal;
calculating a backward CDF of the clean speech signal using the speech vector extracted from the clean speech signal by dividing a variable section of the extracted feature vector of the clean speech signal into a predetermined number of sections, calculating a clean speech probability distribution function (PDF) corresponding to each divided section, and cumulating the calculated clean speech PDF in an order from a greatest value to a smallest value;
extracting a feature vector from a received noisy speech signal;
calculating a backward CDF of the noisy speech signal using the feature vector extracted from the noisy speech signal by dividing a variable section of the extracted feature vector of the noisy speech signal into a predetermined number of sections, calculating a noisy speech probability distribution function (PDF) corresponding to each divided section, and cumulating the calculated noisy speech PDF in an order from a greatest value to a smallest value;
normalizing a feature vector for each band of the noisy speech signal, by using an estimated backward CDF, with the estimated backward CDF being based on an estimating of a value of the noisy speech backward CDF of the noisy speech signal to be a value of the clean speech backward CDF of the clean speech signal, and so that a statistical feature of a feature vector of the noisy speech signal is similar to a model learning vector of the clean speech signal;
post processing the normalized feature vector for each band of the noisy speech signal; and
performing a hidden Markov model (HMM) according to a post processing result of the clean speech signal and a post processing result of the normalized feature vector.

12. The histogram normalization method of claim 10, further comprising:

calculating a probability distribution function corresponding to each band; and normalizing the histogram for the speech feature vector using the backward cumulative distribution function which cumulates the probability distribution function in an order from a greatest to a smallest value.

* * * * *